United States Patent [19]

Rozman et al.

[11] Patent Number: 4,949,021

[45] Date of Patent: Aug. 14, 1990

[54] VARIABLE SPEED CONSTANT FREQUENCY START SYSTEM WITH SELECTABLE INPUT POWER LIMITING

[75] Inventors: Gregory I. Rozman, Rockford; Albert L. Markunas, Roscoe, both of Ill.

[73] Assignee: Sunstrand Corporation, Rockford, Ill.

[21] Appl. No.: 270,625

[22] Filed: Nov. 14, 1988

[51] Int. Cl.⁵ .............................................. H02P 3/18
[52] U.S. Cl. ..................................... 318/254; 318/138
[58] Field of Search ........... 318/138, 139, 254, 254 A, 318/255, 625, 628, 661, 596, 606, 599; 388/811, 819, 829, 831

[56] References Cited

U.S. PATENT DOCUMENTS

| | | | |
|---|---|---|---|
| 3,999,108 | 12/1976 | Tanikoshi | 318/254 A |
| 4,281,276 | 7/1981 | Cutler et al. | |
| 4,292,575 | 9/1981 | Kühnlein et al. | 318/254 A |
| 4,320,331 | 3/1982 | Plunkett | |
| 4,384,242 | 5/1983 | Ono | |
| 4,387,421 | 6/1983 | Zach et al. | |
| 4,507,591 | 3/1985 | Kelleher | 318/138 X |
| 4,520,300 | 5/1985 | Fradella | 318/138 X |
| 4,546,293 | 10/1985 | Peterson et al. | |
| 4,631,458 | 12/1986 | Furuichi | 318/138 X |
| 4,633,382 | 12/1986 | Upadhyay et al. | |
| 4,729,082 | 3/1988 | Sato | |
| 4,780,651 | 10/1988 | Nakano et al. | 318/138 X |

Primary Examiner—William M. Shoop, Jr.
Assistant Examiner—A. Jonathan Wysocki
Attorney, Agent, or Firm—Wood, Phillips, Mason, Recktenwald & Vansanten

[57] ABSTRACT

The problem of providing an engine starting system from any one of a plurality of input power sources is solved with an engine start control apparatus operating a generator as a synchronous motor and employing input power limiting. The motor receives power from a main inverter and an excitation inverter. These inverters are controlled by a control unit which provides for input power limiting and also constant power characteristics in the field weakening range. The control unit includes a pulse width modulation (PWM) generator which is responsive to a voltage command and a commutation command to develop switching signals for controlling the switches in the start inverter. The voltage command is used to vary the duty cycle of the PWM signals. The commutation angle command is used to control the timing of the PWM signals. In addition to commutation angle control, the start control system employs field weakening control to obtain constant power characteristics.

17 Claims, 9 Drawing Sheets

FIG. 2

VARIABLE SPEED CONSTANT FREQUENCY START SYSTEM WITH SELECTABLE INPUT POWER LIMITING

FIELD OF THE INVENTION

This invention relates to electrical power systems and more particularly to a dual mode control system therefor including a generate mode of operation and a start mode of operation.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power using a variable speed constant frequency (VSCF) system including a power converter which may develop, for example, 115/200 Vac power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Prior to starting the aircraft engine, it may also be necessary to provide a braking operation if the engine is windmilling. Accordingly, the GCCU start system must provide for engine starting under windmilling conditions.

Additionally, the generator control unit must operate in the start mode of operation to provide smooth engine starting for bringing the engine up to speed, and subsequently while transferring to the generate mode of operation.

The present invention is intended to overcome one or more of the problems as set forth above.

SUMMARY OF THE INVENTION

In accordance with the present invention, a start control system for a brushless DC machine is operable to maintain constant motor current and thus control input power.

Broadly, there is disclosed herein a start control system for a brushless DC machine having a rotor and a stator having a stator coil which is controllably energized from a source of DC power defining a positive and a negative DC voltage for imparting rotation to the rotor. The control system includes means for sensing the rotational position of the rotor, and switching means coupled between the source of DC power and the stator coil for alternately applying the positive and negative voltage to the coil according to the rotational position of the rotor. Means are included for developing a stator current reference signal representing a desired stator current level, and means for generating an actual stator current signal representing an actual current level to the stator coil. Control means are coupled to the developing means, the generating means and the switching means for modifying the rotational position at which the positive and negative voltages are applied to the coil according to a difference between the desired and actual stator current level to provide constant current starting.

Specifically, the disclosed start system is used for starting an engine using a brushless synchronous generator operating as a motor. The motor receives power from a start inverter and an excitation inverter. These inverters are controlled by a control unit which provides for current control and constant power characteristics in the field weakening range.

The control unit includes a pulse width modulation (PWM) generator which is responsive to a voltage command and a commutation command to develop switching signals for controlling the switches in the start inverter. The voltage command is a level corresponding to rotor speed plus a boost voltage to offset the IR drop of the machine at low speeds. The voltage command is used to vary the duty cycle of the PWM signals.

In order to develop the commutation angle command signal a selection logic circuit selects the lower of a power error and a current error. The power error represents the difference between the input power and a power reference, while the current error represents the difference between the motor stator current and a reference. The selected error is transferred to a compensation unit which provides proportional integral action for speeds above a minimum operating speed. The resulting signal is summed with a minimum commutation angle and is limited prior to being transferred to the PWM generator.

At the beginning of a start cycle the commutation angle is kept constant while voltage is increased to speed up the motor. When speed exceeds a preselected minimum value, the commutation angle command signal is permitted to change. Specifically, at relatively low speeds, constant torque operation is implemented. At this time, power error is at a high level and the current error is small. Therefore, closed loop current control is used to adjusted the commutation angle and maintain constant current. At speeds above the break point between constant torque and constant power, the motor field is weakened and the commutation angle command signal is varied to provide constant current and constant power.

According to the invention, input power limiting is provided by controlling the commutation angle responsive to the power error if the input power exceeds the power reference.

Specifically, it is a feature of the present invention that the input power reference signal is selected according to the power capacity of the power source in order to provide input power limitation in accordance with input power requirements.

It is another feature of the invention, that the start system includes means for permitting engine start under windmilling conditions.

An engine start system including this other feature, in addition to the motoring with constant torque and constant power modes, provides for a braking mode of operation and a plugging mode of operation. The mode of operation is determined according to rotor speed. The braking mode is implemented during windmilling when the engine spins in the opposite direction. The start inverter is operated to short the motor armature to provide the braking effect. The plugging mode of operation provides a transition between braking and motoring modes. Particularly, the voltage command and the commutation angle command are set equal to a constant value.

It is still another feature of the present invention that the motor is operated at a unity power factor to avoid excessive reactive power flow which would otherwise create heating losses in the motor and converter. Specifically, the magnitude of the field excitation is reduced in the constant power mode of operation to satisfy unity power factor requirements. Accordingly, constant power characteristics are provided in the field weakening range.

Further features and advantages of this invention will readily be apparent from the specification and from the drawings.

BRIEF DESCRIPTION OF THE DRAWINGS

FIG. 8 is a block diagram similar to that of FIG. 3 for an alternative embodiment of the invention.

DESCRIPTION OF THE INVENTION

Figure 1:
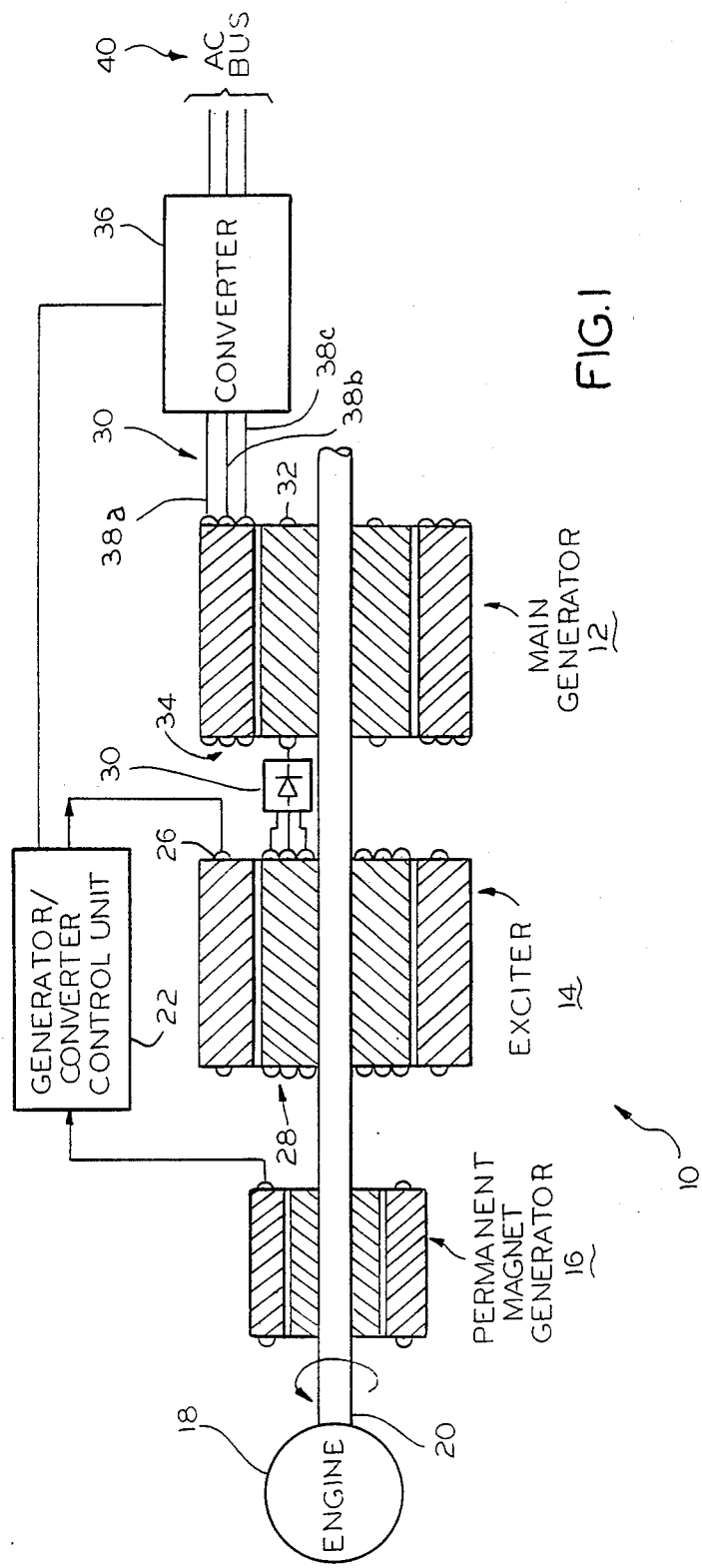
FIG. 1 is a combined diagrammatic illustration-block diagram of an electrical system incorporating the start system of the present invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20.

A generator/convertor control unit (GCCU) 22 receives the power developed by the PMG and delivers a controlled current to a field winding 26 of the exciter generator 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings 34. The stator windings 34 develop polyphase output power which is delivered to a converter 36 over a bus 38 comprising at least three conductors 38a, 38b, and 38c.

In a typical application, the engine 18 is the main engine in an aircraft, and the converter 36 is part of a variable speed constant frequency (VSCF) system for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
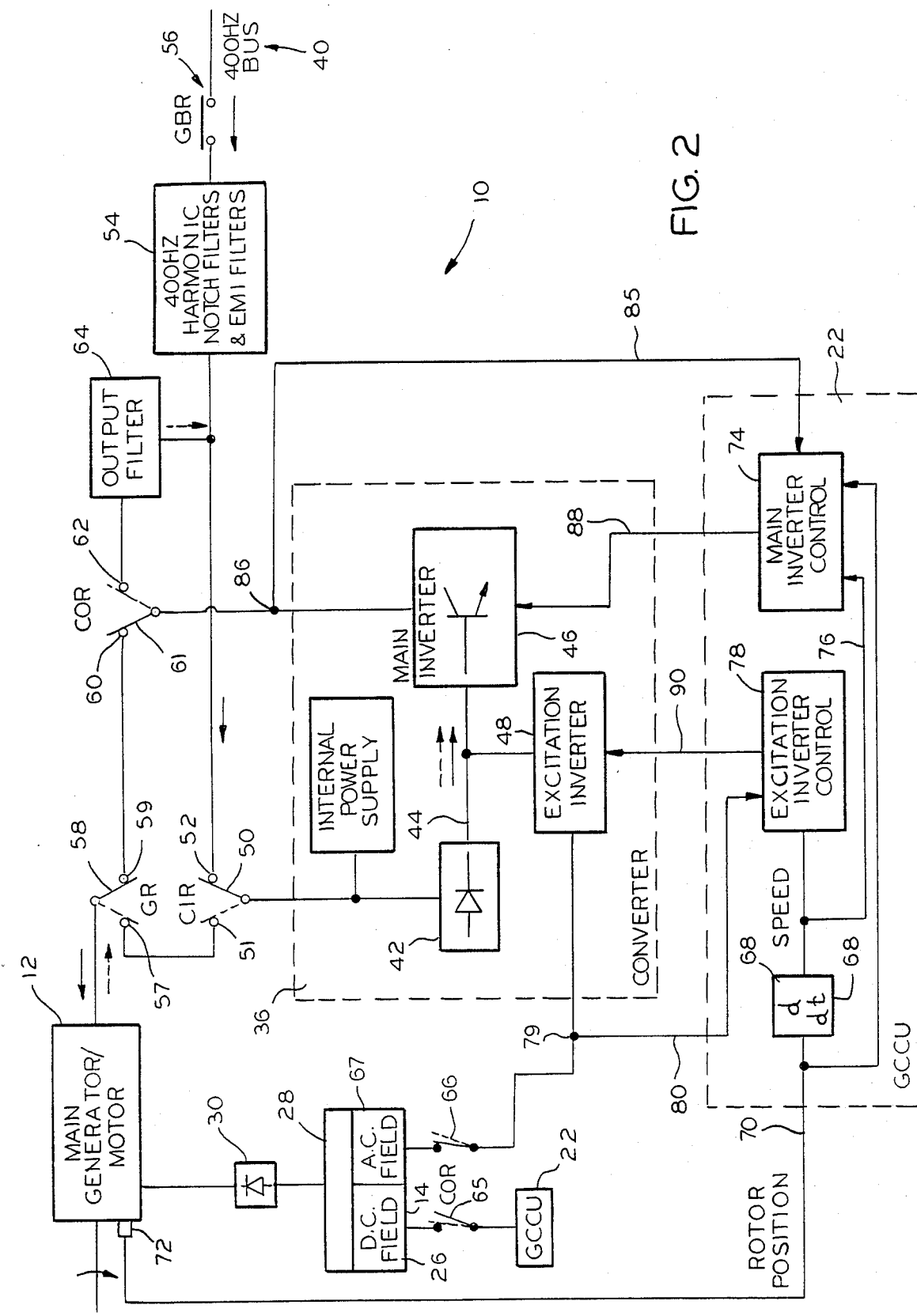
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link 44 to a DC/AC converter 46. Particularly, according to the illustrative embodiment of the invention, the AC/DC converter 42 comprises a full wave bridge rectifier circuit of conventional construction which is operable to convert three phase AC power to DC power, the DC link 44 includes a conventional filter, and the DC/AC converter 46 comprises a main inverter circuit, described more specifically below relative to FIG. 4. The converter 36 also includes an excitation inverter 48 connected to the DC link 44 for developing AC power for the motor field during the start mode of operation.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the windings 34 shown in FIG. 1. The second fixed contact 59 is connected to a first fixed contact 60 of a converter output relay (COR) The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter field winding 26 to the GCCU 22. The second switch 66 connects the excitation inverter 48 to an AC start field winding 67 of the exciter 14. Specifically, the excitation for the wound field main generator/motor 12 cannot be supplied at zero speed by the exciter 14. Accordingly, the excitation inverter 48 and the start field winding 67 are included functioning as a rotary transformer. Specifically, AC power delivered to the exciter AC field winding 67 develops corresponding AC power in the armature windings 28 for powering the motor field winding 32.

During engine start, the relays GR, CIR and COR are operated as shown in solid line in FIG. 2. Conversely, in the generate mode, these relays GR, CIR and COR are operated as shown dashed lines in FIG. 2.

Although the relays GR, CIR and COR are shown as providing a single line connection, each of the relays is provided with suitable switches to switch three phase power, as is well known.

The GCCU 22 includes a speed converter 68 which receives a rotor position signal on a line 70 from a rotor position sensor 72 associated with the main generator 12. The position sensor 72 may be, for example, a conventional resolver. The rotor position signal 70 is also transferred to a main inverter control 74. The speed converter 68 may perform a derivative operation for converting rotor position to speed, as is well known. The main inverter control also receives the speed signal on a line 76 from the speed converter 68. The main inverter control 74 develops base drive commands on a line 88 for controlling the inverter 46. An exciter inverter control 78 also receives the speed signal on the line 76 from the speed converter 68 and a start exciter current signal on a line 80 from an excitation inverter current sensor 79. The exciter inverter control 78 develops base drive commands on a line 90 for driving the switches of the excitation inverter 48.

In the generate mode of operation, with the relay contacts GR, CIR and COR as illustrated in dashed lines, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the inverter 46 which converts the power to AC power of constant frequency. The constant frequency AC power from the inverter 46 is delivered through the CIR relay movable contact 61 to the second fixed contact 62, through the output filter 64, and the filter 54 to the AC bus 40. Field power is developed by the exciter 14 through the first field control switch 65.

In the start mode of operation, the relays GR, CIR and COR are controlled so that their contacts are positioned as shown solid lines. Particularly, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the stator windings of the main generator/motor 12. Field power to the main generator 12 is provided from the excitation inverter 48 through the second COR field control switch 66.

Figure 3:
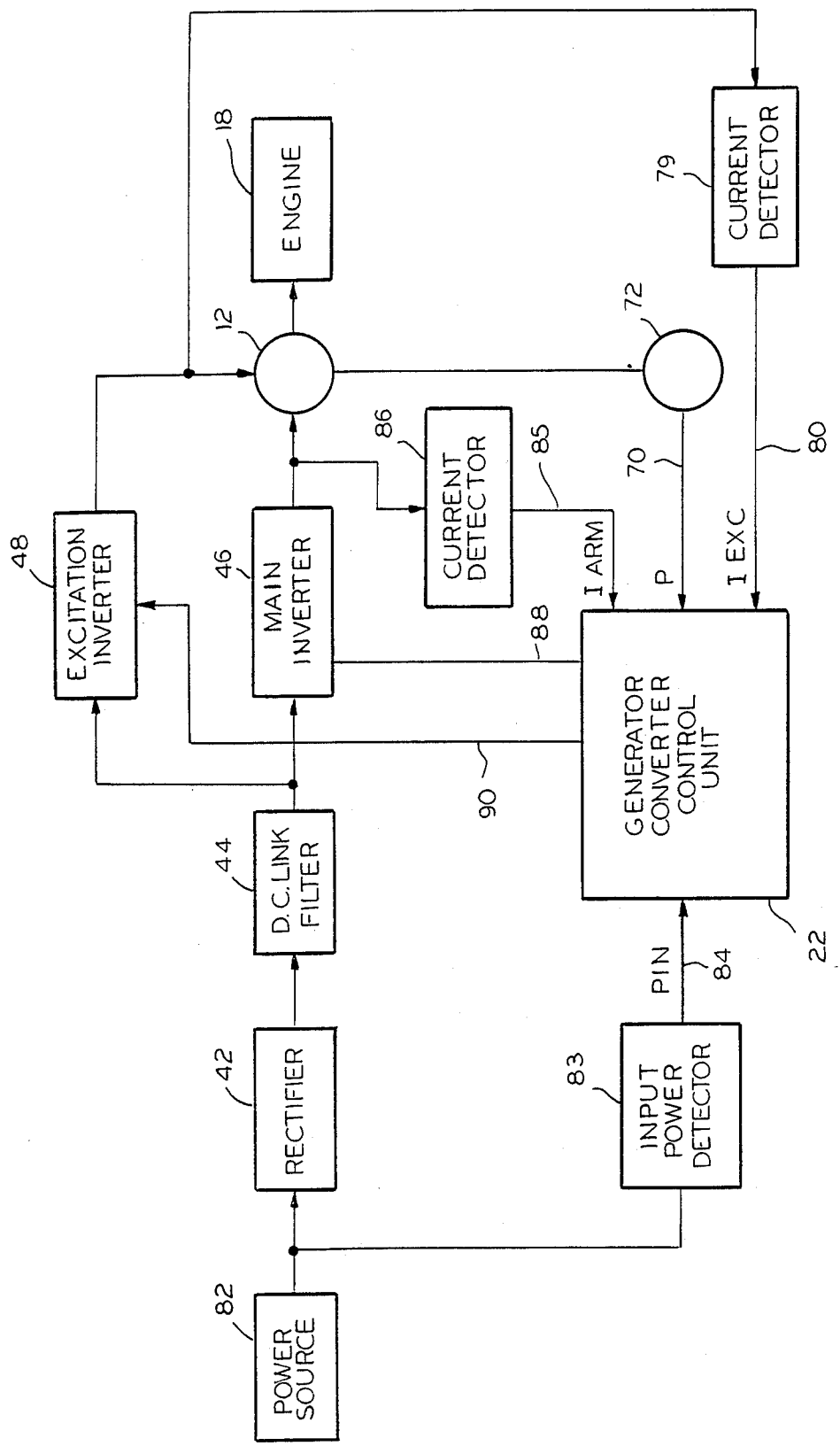
FIG. 3 is a block diagram of the control system specifically illustrating the start mode of operation.

Referring now to FIG. 3, a block diagram representation more specifically illustrates the operation of the electrical power system 10 according to the invention in the start mode of operation, as discussed immediately above. A power source 82 is coupled to the rectifier 42 which is coupled through the DC link filter 44 to both the main inverter 46 and the excitation inverter 48. An input power detector 83 senses input power from the power source 82 and develops an input power level signal on a line 84 to the GCCU 22. The GCCU 22 also receives an armature current signal on a line 85 from a current detector circuit 86 which may be, for example, a current transformer which senses current from the main inverter 46 to the motor 12. The GCCU 22 also receive the position signal on the line 70 from the rotor position sensor 72 and the excitation current signal on the line 80 from the current detector 79. As discussed above, the GCCU 22 develops the base drive commands for the main inverter 46 on the line 88 and the base drive commands for the excitation inverter 48 on the line 90.

Figure 4:
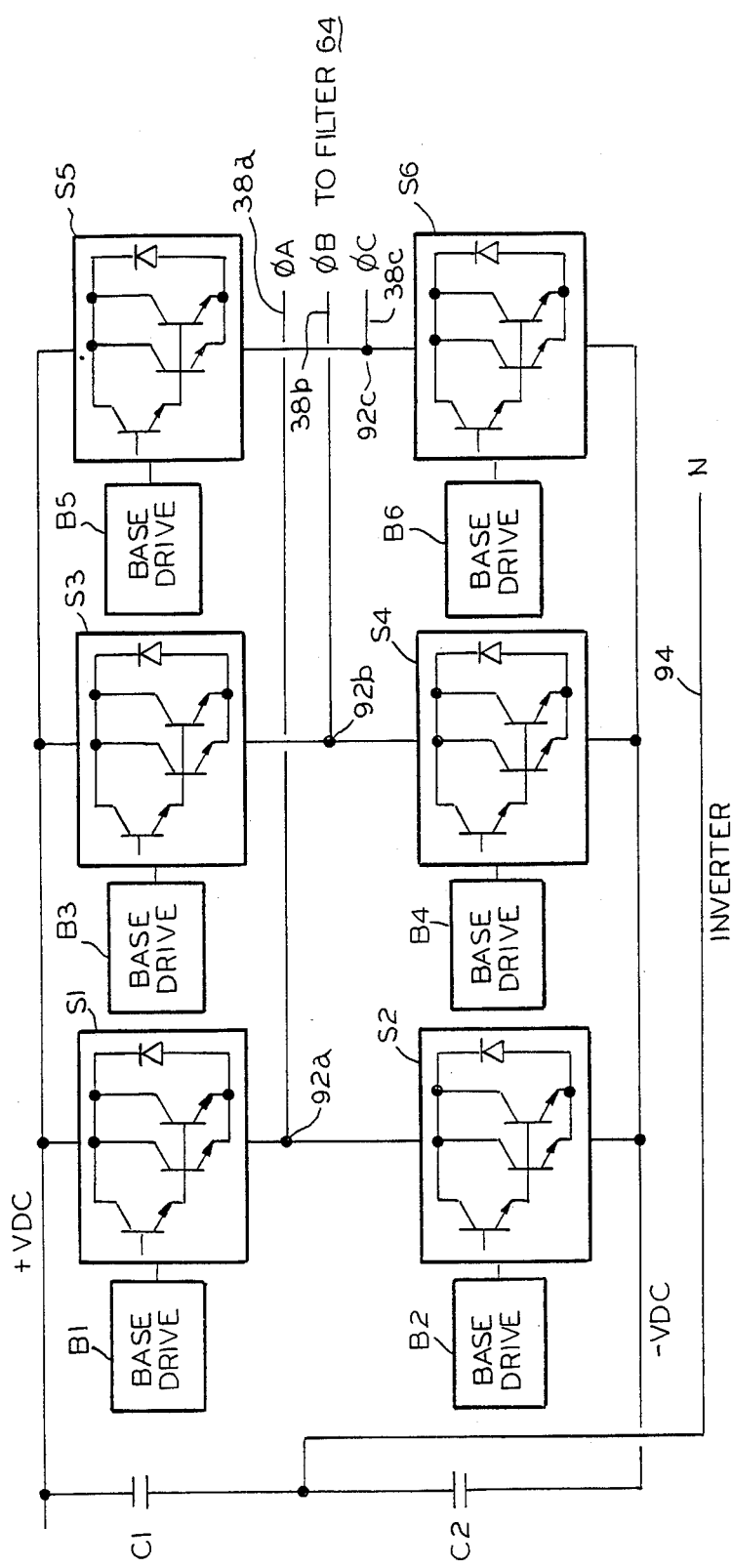
FIG. 4 is a schematic diagram illustrating the start inverter of FIG. 3.

Referring to FIG. 4, a schematic diagram illustrates one alternative circuit for the main inverter 46. Particularly, the inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner. The switch circuits S1–S6 are connected between the plus voltage DC rail and the minus voltage DC rail of the DC link filter 44. The 3-phase armature windings 34 of the main generator 12 are connected by the lines 38a–38c, respectively, to junctions 92a–92c between pairs of series-connected switch circuits S1–S6. A neutral line 94 to the main generator 12 is connected at a junction between filter capacitors C1 and C2 across the DC link filter 44.

Although not shown, the excitation inverter 48 may be of generally similar construction to the main inverter 46 illustrated in FIG. 4. Alternatively, other circuits may be utilized for either or both of the main inverter 46 and the excitation inverter 48, as is well known.

Figure 5:
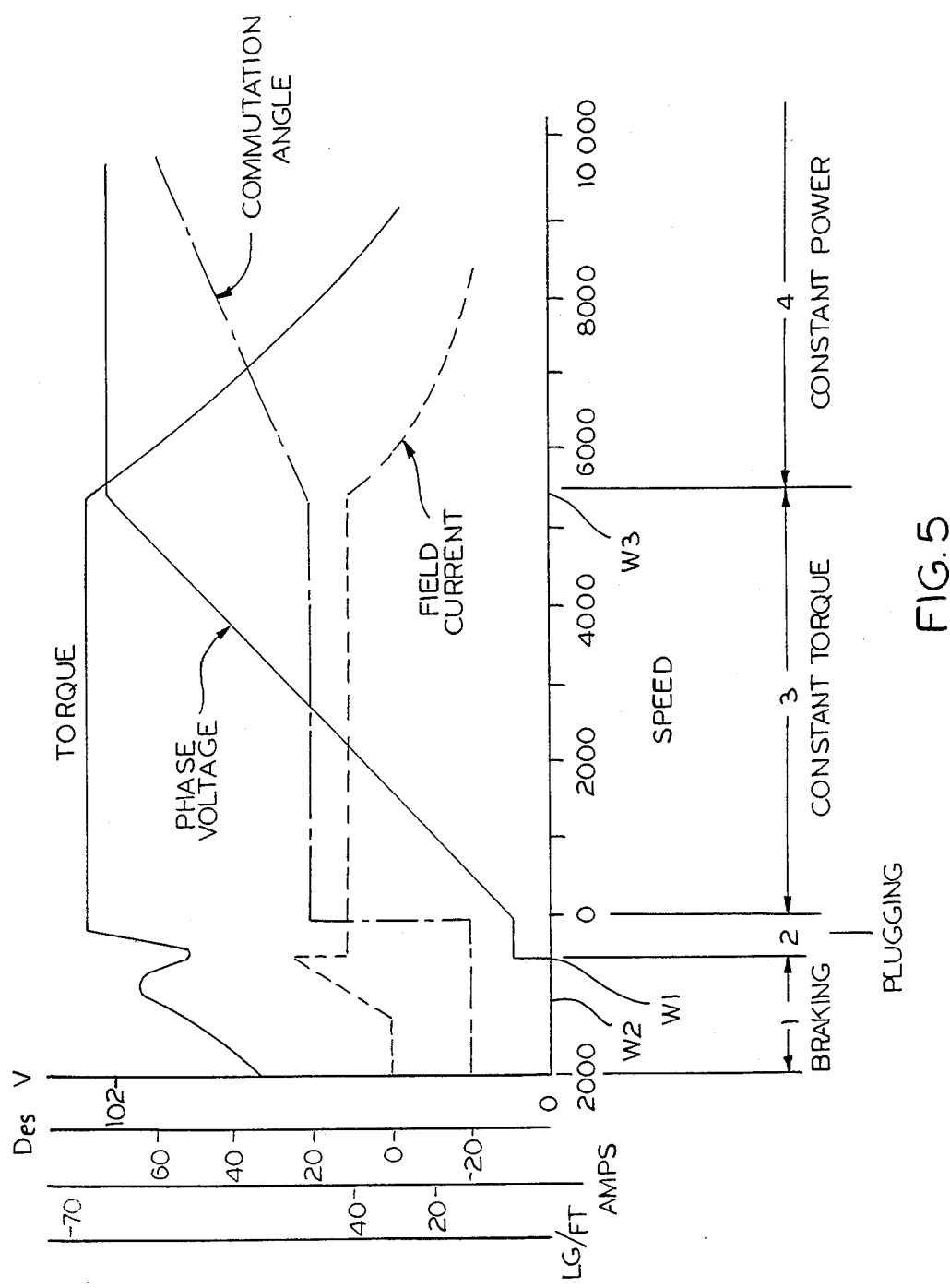
FIG. 5 is a series of curves illustrating the desired speed relationship of various motor operation parameters according to the start control of the invention.

With reference to FIG. 5, a series of motor parameter curves generally illustrate desired motor operation during the start mode as implemented by the control according to the invention. Specifically, the start mode includes four control modes of operation—namely, (1) braking, (2) plugging, (3) motoring with constant torque, and (4) motoring with constant power.

The braking mode occurs during windmilling when the engine shaft 20, see FIG. 1, spins in the opposite direction. As described more specifically below, at speeds more negative than $W_1$, the motor armature windings 34 are shorted to provide a braking effect. The armature current is limited by a preset value of the field current which is kept constant below speed $W_2$, and then increased inversely proportional to speed The plugging mode is a transition mode between the braking and motoring modes and occurs between speed $W_1$ and zero. The field current is reduced for constant torque operation, and the armature voltage is increased. The commutation angle, discussed more specifically below, is held constant and it is selected to provide an acceptable stator current. The commutation angle represents the phase advance which is the angle between the applied field and the rotor position A constant torque motoring mode occurs at speeds between zero and $W_3$. In this mode, constant torque is achieved by maintaining the air gap flux constant. The air gap flux is held constant by applying constant field current and by maintaining the armature voltage to speed ratio at a constant. Particularly, the field current is selected to provide unity power factor motor operation. The commutation angle is selected to maintain stator motor current at the desired constant level. Specifically, power is a function of both the product of torque and speed and the product of applied voltage and current. By maintaining a constant volt/hertz ratio the torque varies as a function of current. Therefore, if current is maintained constant, then torque is also constant.

Beyond the base (1.0 p.u.) speed the motor operates in constant horsepower mode and the maximum torque decreases as the volts/hertz ratio decreases. The field is adjusted to maintain the unity power factor at the machine terminal. If the motor is not operating at unity power factor, then current is recirculating in the motor windings, and is therefore non-functional. Also, reactive power flow creates heating losses in the motor and converter. In order to maintain unity power factor the field current is reduced. This is commonly referred to as field weakening, which is associated with constant power operation. However, by reducing field current the torque decreases by the square of changes in speed. To compensate, the commutation angle is increased. By firing the inverter switches sooner, known as phase advance, a field is created which leads the rotor. A change in phase advance is accomplished by changing the commutation angle, resulting in a similar change in torque angle. Thus by controlling commutation angle and utilizing field weakening, the armature current, and thus also power, is maintained constant.

Figure 6:
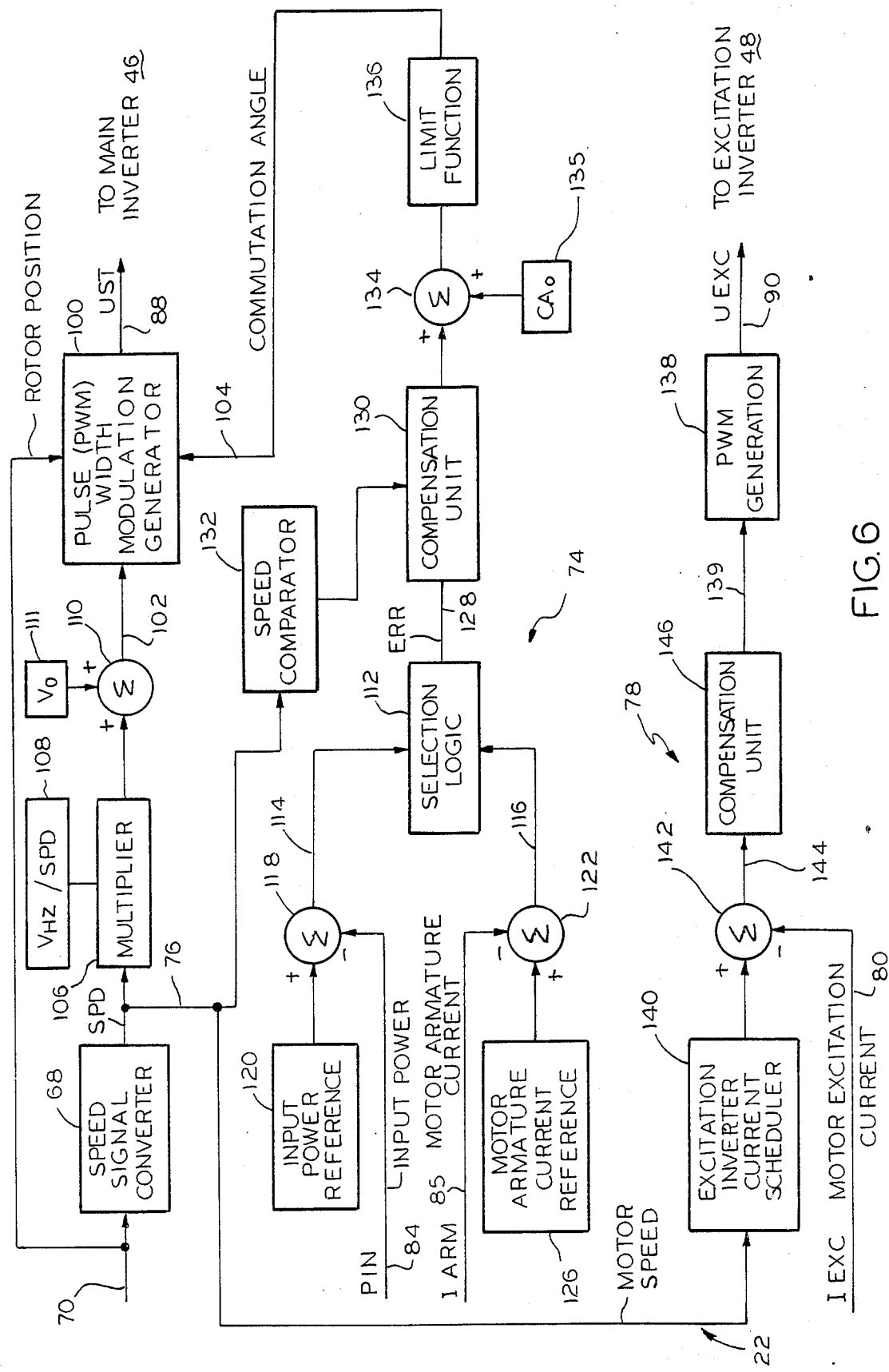
FIG. 6 is a detailed block diagram of the generator/convertor control unit (GCCU) of FIG. 3.

The above described constant torque and constant power motoring modes of operation are achieved with the GCCU 22 illustrated in block diagram form in FIG. 6, including the main inverter control 74 and the excitation inverter control 78, see FIG. 2.

The main inverter control 74 includes a pulse width modulation (PWM) generator 100. The PWM generator 100 receives the position signal on the line 70, a voltage command on a line 102, and a commutation angle command on a line 104. The PWM generator 100 derives the base drive commands which are transferred on the line 88 to the base drive circuits B1-B6 of the main inverter 46, see FIG. 4. The PWM generator 100 may be of any conventional construction. Particularly, the PWM generator 100 develops base drive signals to control the output voltage of the main inverter 46, by varying the duty cycle of the PWM signals. The duty cycle is proportional to the voltage command received on the line 102. The fundamental frequency of the inverter output is determined by motor speed. The output waveforms are synchronized to the rotor position as determined by the sensor 72, see FIG. 3. The phase difference between rotor position and inverter output is adjusted in accordance with the commutation angle command on the line 104.

The voltage command on the line 102 is formed by converting the rotor position signal on the line 70 to a speed signal on the line 76 via the speed signal converter 68. A multiplier 106 multiplies the speed signal by a constant from a block 108. Particularly, the constant represents a desired volt/hertz ratio. A summer 110 receives the output from the multiplier 106 and a constant $V_0$, which is proportional to "boost" voltage, from a block 111. The boost voltage is required to offset the IR drop of the machine at low speed. The output of the summer 110 is the voltage command on the line 102.

In order to develop the commutation angle command on the line 104, a selection logic circuit 112 selects the lower of a power error on a line 114 and a current error on a line 116. The power error is determined by a summer 118 which subtracts the input power on the line 84, determined by the detector 83, see FIG. 3, from an input power reference 120. The input power reference 120 represents a preselected desired limit for input power which is available for engine starting.

The current error on the line 116 is determined by a summer 122. The summer 122 subtracts motor armature current on the line 85, as determined by the current detector 86, see FIG. 3, from a motor armature current reference 126. The current reference value is selected to maintain a desired torque during engine starting.

The selection logic circuit 112 transfers the lower of the two errors over a line 128 to a compensation unit 130. The compensation unit 130 provides stability in controlling input power or armature current by utilizing, for example, a proportional and integral control algorithm for speeds above a preselected minimum operating speed. Particularly, the compensation unit receives an enable command from a speed comparator 132 which compares the speed signal from the speed signal converter 68 to a preselected minimum value. The speed comparator 132 enables closed loop control to be used only when the engine is rotating at speeds above the preselected minimum. This prevents a wind-up condition of the integrator. Also, it is desirable to disable the control loop at very low speeds because the current sensed by the current detector 86 may be unreliable.

The output from the compensation unit 130 represents a desired commutation angle and is provided to a summer 134. Another input from the summer 134 is a minimum commutation angle $CA_0$ which is selected according to motor parameters. This is the commutation angle which is used at stall conditions and at speeds below the value determined by the speed comparator 132. Above this speed, the commutation angle is equal to the value determined by the compensation unit 130 plus the value $CA_0$. The output of the summer 134 is coupled to a limit function 136 which develops the commutation angle command on the line 104. The limit function 136 prevents the control system from operating in an unstable region, which can occur if the commutation angle command exceeds the maximum angle. This maximum angle is a function of speed and motor parameters.

The excitation inverter control 78 controls field current in the motor 12 and is controlled by varying the duty cycle of PWM signals from a PWM generator 138. Specifically, the PWM generator 138 develops the base drive command signals on the line 90 for controlling the excitation inverter 48, see FIG. 3. The duty cycle is proportional to a voltage reference which is applied to the PWM generator 138 on a line 139.

An excitation inverter current scheduler 140 stores a lookup table. The lookup table represents desired excitation current relative to motor speed, to maintain the field current as represented by the curve shown in FIG. 5 The output of the current scheduler 140 is transferred to a summer 142 which subtracts the excitation current signal on the line 80, determined by the current detector 79, see FIG. 3, to develop an excitation current error on a line 144. The error on the line 144 is provided to a compensation unit 146 which contains a proportional integral algorithm, the output of which is the voltage reference on the line 139 to the PWM generator 138.

The operation of the GCCU 22 illustrated in figure 6 is now described with reference to the curves shown in FIG. 5. At the beginning of the start motoring mode of operation, i.e., the speed is zero, the commutation angle command on the line 104 is determined by the constant $CA_0$, since the compensation unit 130 is disabled by the speed comparator 132, and the voltage command on the line 102 is equal to the boost voltage $V_0$. The excitation inverter current, as determined by the scheduler 140, is set equal to the preselected constant value to maintain the field current as shown in the curve. The PWM generator 100 begins to develop base drive commands to the main inverter 46 according to the initial rotor position. The interaction between the magnetic field established in the rotor and stator current causes movement of the main generator rotor. As speed increases, the commutation angle command on the line 104 is initially held constant while the voltage command on the line 102 is increased proportionally according to the volt/hertz ratio set at the block 108 to increase the duty cycle and speed up the motor. When speed exceeds the preselected minimum value determined by the speed comparator 132, the commutation angle command signal on the line 104 is permitted to change. At relatively low speeds, below $W_3$, constant torque operation is implemented. Specifically, torque is held constant by maintaining armature current constant. This is done by closed loop current control implemented by controlling the commutation angle command on the line 104 responsive to current error. Particularly, at low speeds the power error on the line 114 is at a relatively high value and the current error on the line 116 is normally lower. Therefore, the error on the line 128 represents the current error and closed loop current control is used to adjust commutation angle.

As stator voltage increases, and reaches the base speed $W_3$, see FIG. 5, the inverter 46 is utilizing the full DC voltage from the DC link 44. Thus, at speed $W_3$ the start operation changes to constant power operation.

In the constant power mode of operation, the commutation angle and the excitation current are controlled to maintain unity power factor and maintain constant power. At speeds above $W_3$, although the voltage command on the line 102 continues to increase, the applied voltage is limited by the fixed input voltage from the power source 82 and the main inverter is controlled in square-wave operation. Thus the applied voltage is constant. Constant power is provided by controlling the commutation angle in accordance with the current error on the line 116. The excitation current is controlled by the scheduler 140 decreasing the excitation current reference in accordance with the field current curve illustrated in FIG. 5.

Figure 7:
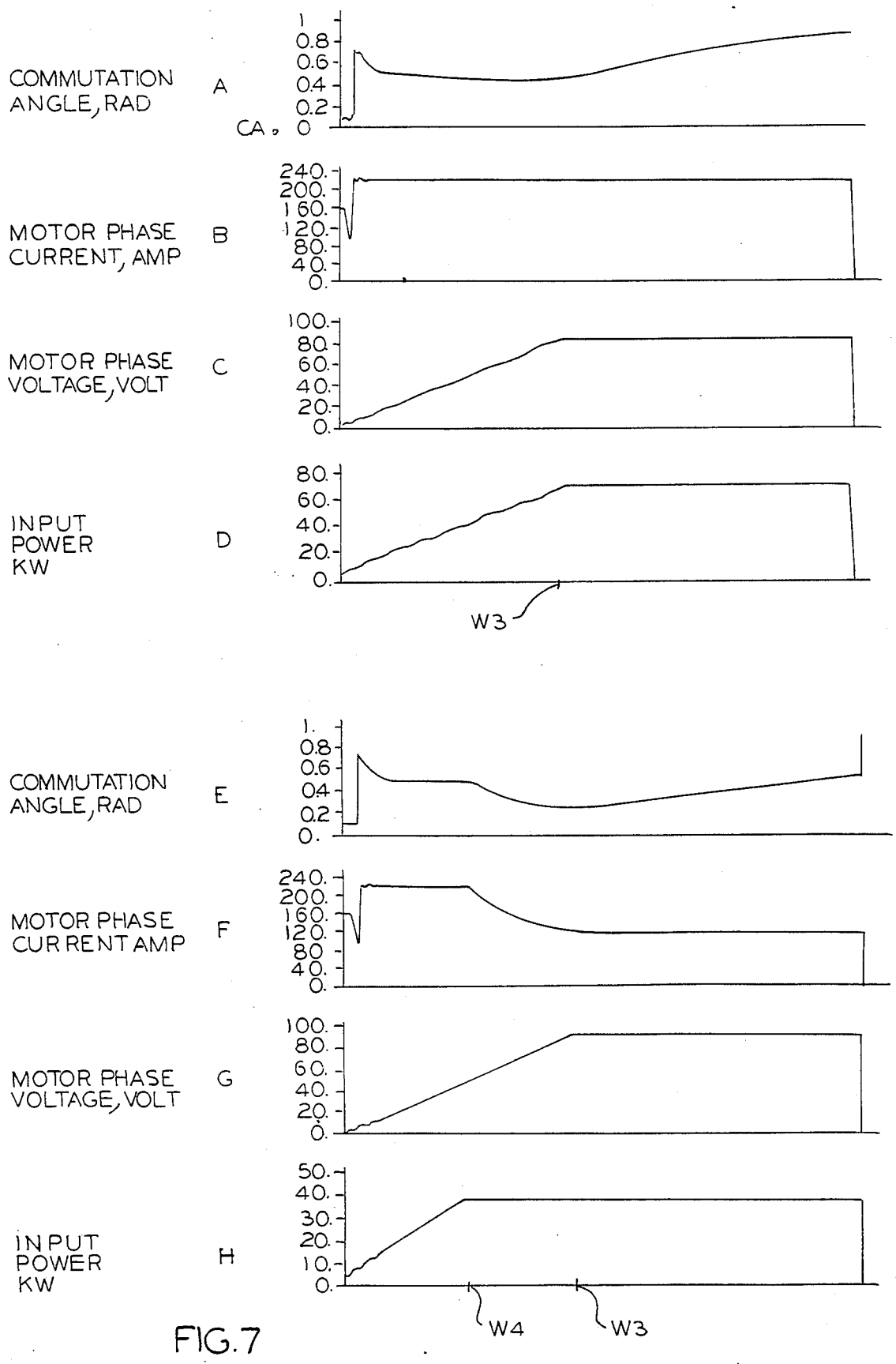
FIG. 7 and 8 are a series of curves illustrating motor parameters for examples of motor starting operation.

With reference to FIG. 7, a series of curves A–D illustrate the operation of the power system 10 in the start mode of operation in an illustrative example wherein the power reference 120, see FIG. 6, is set to a value greater than the input power available from the power source 82. With reference to curve A, the commutation angle, in radians, is initially set to the value $CA_0$ until the preselected minimum speed determined at the comparator 132 is exceeded. Thereafter, the angle is controlled in a closed loop operation, as described above. The motor phase current, illustrated in curve B, is maintained at a substantially constant level from the time the closed loop control is implemented. The motor phase voltage, see curve C, ramps at a generally constant rate, as determined by the volt/hertz ratio, from zero speed up through the base speed $W_3$. Subsequently, the voltage is constant in accordance with the fixed input voltage. The input power generally tracks the motor phase voltage, see curve D. Particularly, above the base speed $W_3$ the input power is constant due to the fixed input voltage and the constant current maintained by controlling the commutation angle, as illustrated in curve A. The commutation angle increases substantially proportionally to speed. This is due to the necessity of counteracting decreases in the field current, which is required to maintain unity power factor.

Curves E–H illustrate the operation of the power system 10 in the start mode of operation in an illustrative example wherein the power reference 120, see FIG. 6, is set to a value less than the input power level necessary to satisfy motor requirements. This situation occurs if the power source 82 has a limited capacity available for engine starting, or if some of the power may be necessary to power other aircraft loads while also starting the engine.

The start operation is initially similar to that described above in the example relative to curves A–D. However, at speed $W_4$, the input power, see curve H, as determined by the power detector 84 exceeds the input power reference 120. Therefore, closed loop power control is implemented by the selection logic circuit 112, see FIG. 6. Motor phase voltage, see curve G, continues to increase proportionally to speed as the duty cycle of the PWM generator 100 is increased by the voltage command on the line 102. However, since the input power error on the line 114 is lower than the current error on the line 116, the commutation angle, see curve E, is decreased to compensate for the error and thus limit the input power, causing a resultant decrease in motor current, see curve F. At the base speed $W_3$, the motor phase voltage reaches its peak. Thereafter constant power control is implemented as with the above example by controlling the commutation angle to maintain constant current and constant power.

In accordance with the above-described embodiment, the GCCU 22 permits constant power characteristics to be provided in the field weakening range. Moreover, input power limiting is provided in accordance with input power capability to provide for the efficient utilization of the input power and the widening of constant output characteristics.

Figure 8:
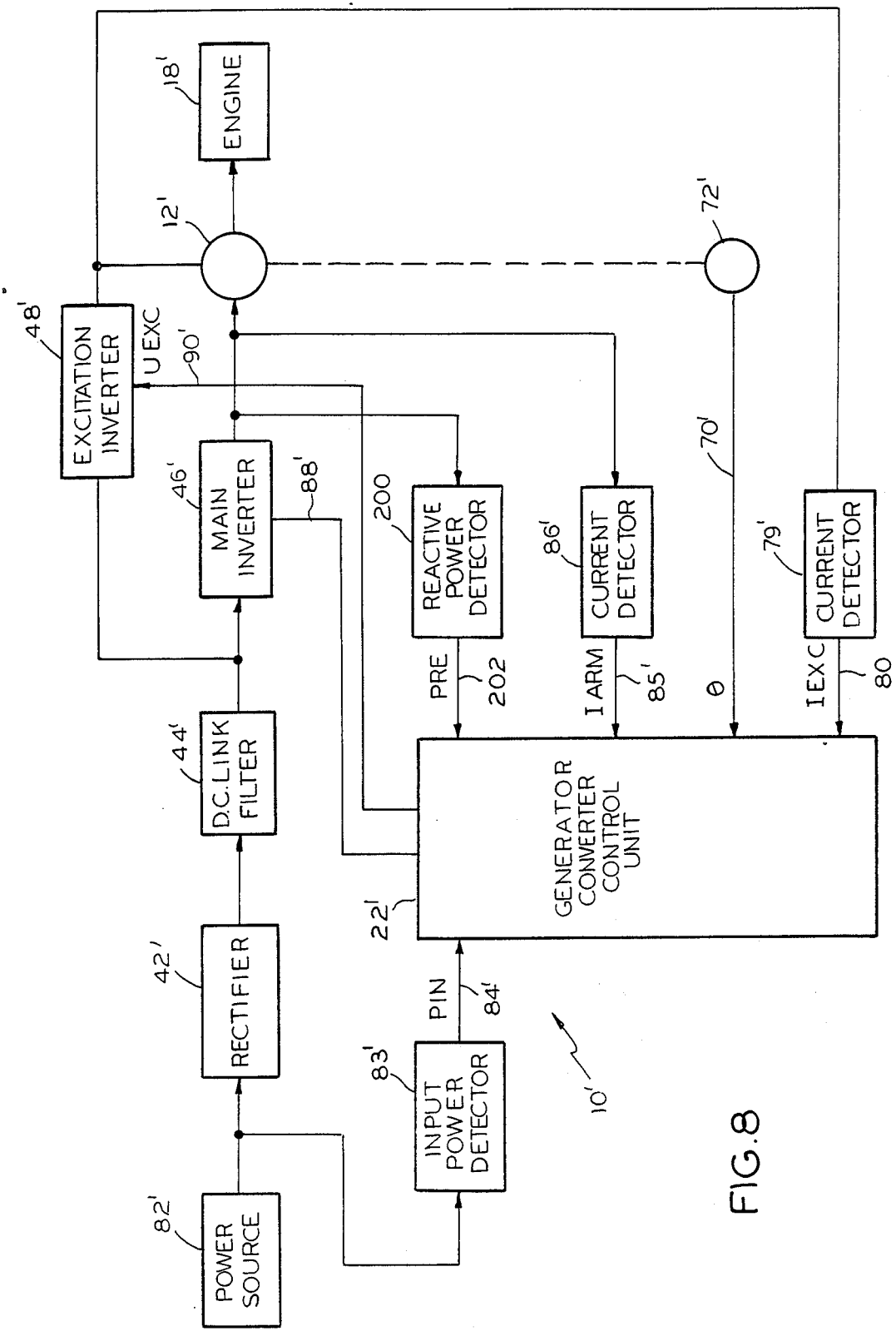

With reference to FIG. 8, a block diagram illustrates a power system 10' configured to operate in a start mode of operation according to an alternative embodiment of the invention Specifically, the system 10' is generally similar to the system 10 described above relative to FIG. 3, but further includes control components for implementing the braking and plugging modes of operation, and a closed loop field current control.

For simplicity, elements similar to those shown above in FIG. 3 are referenced with like, primed referenced numerals. For example, the main inverter 46' of FIG. 8 is generally similar to the main inverter 46 of FIG. 3. Accordingly, such elements referenced with primed numerals are not described in detail hereinbelow.

The principal difference in the generalized block diagram representation of the system 10' is the addition of a reactive power detector 200 of conventional form which measures the reactive power from the main inverter 46' to the motor 12'. The reactive power signal is transferred on a line 202 to the GCCU 22'.

Figure 9:
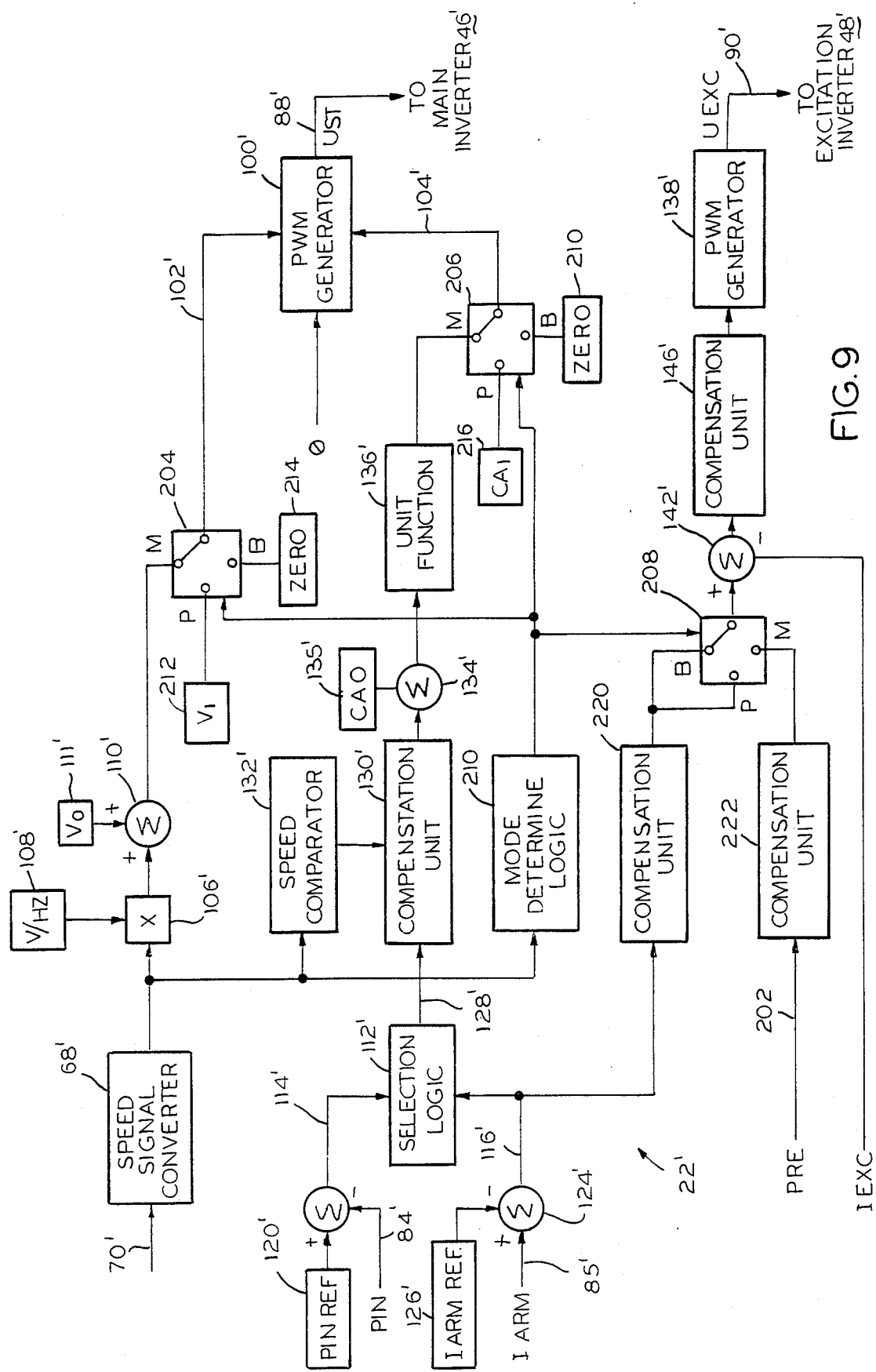
FIG. 9 is a detailed block diagram of the GCCU of FIG. 8.

With reference to FIG. 9, a block diagram illustrates a control for the GCCU 22'. As above, the GCCU 22' is generally similar to the GCCU 22 of FIG. 6, and like elements are referenced with like primed reference numerals.

The GCCU 22' differs principally in including first, second and third mode selection switches 204, 206, and 208, respectively, driven by a mode determination logic circuit 210. Each of the switches 204, 206, and 208, is a three position switch which connects its output to one of three inputs, labelled M, P and B, according to whether the GCCU 22' is operating in a motoring mode, a plugging mode, or a braking mode, respectively. The mode is determined by the mode determination logic circuit 210 which receives a speed signal from the speed signal converter 68' and is operable to control the position of the switches 204, 206, and 208.

The output of the first switch 204 is the voltage command on the line 102'. In the motoring mode, the first switch 204 couples the summer 110' to the line 102'. In the plugging mode, the first switch 204 couples a block 212 containing a constant value V1 to the line 102'. Lastly, in the braking mode, the first switch 204 connects the line 102' to a block 214 which has the value zero.

The output of the second switch 206 is connected to the line 104' which carries the commutation angle command. In the motoring mode, the second switch 206 connects the limit function block 136' to the line 104'. In the plugging mode, the second switch 206 connects a block 216 which includes a constant value $CA_1$ to the line 104' Lastly, in the braking mode, the second switch 206 connects the line 104' to a block 218 which includes the constant value zero.

The output of the third switch 208 is connected to one of the inputs of the summer 142'. In both the braking and plugging modes of operation, the third switch 208 connects the summer 142' to a compensation unit 220 which has as its input the motor armature current error signal on the line 116'. In the motoring mode, the third switch 208 couples the summer 142' to another compensation unit 222 which has as its input the reactive power signal on the line 202.

The operation of the GCCU 22' is as described below.

The braking mode occurs during windmilling when the engine spins in the opposite direction at speeds below $W_1$, see FIG. 5. The switches 204, 206 and 208 are set in the B mode position by the mode determination logic circuit 210. The start inverter PWM generator 100' shorts the motor armature as a result of the zero voltage command from the block 214 to provide the desired braking effect. Further, in the braking mode the armature current is controlled by the excitation converter 48' via the compensation unit 220. Particularly, the compensation unit 220 provides proportional and integral compensation of the armature current error on the line 116' which is applied to the summer 142' as an excitation current reference. The PWM generator 138' controls field current responsive thereto, as discussed above.

During electric braking, the kinetic energy is dissipated in the motor 12' and not in the main inverter 46'. Therefore, the inverter 46' is designed to meet the motoring requirements, and does not need to be provided with any additional capacity to handle the braking mode.

The plugging mode of operation is a transition between the braking mode and the motoring mode. The start inverter 46' is controlled proportional to the voltage reference signal $V_1$ from the block 212 and the commutation angle command signal $CA_1$ from the block 216, both of which are constants. The excitation inverter 48' is controlled the same as in the braking mode, discussed above.

In the motoring mode, above zero speed, the PWM generator 100' is controlled in a like manner as the PWM generator 100, see FIG. 6. However, according to the alternative embodiment of the invention, motor field current is controlled in a closed loop fashion in accordance with the reactive power to provide unity power factor control. The excitation inverter current reference is developed by the compensation unit 222 which stabilizes the reactive power using closed loop control. Specifically, the reactive power is controlled to be equal to zero, which corresponds to the unity power factor.

Thus, in accordance with the above, in addition to the selectable input power limiting circuit, the control according to the alternative embodiment of the invention provides a VSCF start system which employes a synchronous motor and converter to permit engine start under windmilling conditions.

Each of the GCCU's 22 and 22' described herein can be implemented with suitable electrical or electronic circuits, or with a software programmed control unit, as is obvious to those skilled in the art.

Thus, the invention broadly comprehends a start control system for a brushless DC machine utilizing selectable constant current control and input power limiting.

We claim:

1. A start control system for a brushless machine having a rotor and a stator having a stator coil which is controllably energized from a source of DC power defining a positive and a negative DC voltage for imparting rotation to the rotor, comprising
    means for sensing the rotational position of said rotor;
    switching means coupled between the source of DC power and the stator coil for alternately applying the positive and negative voltage to the coil according to the rotational position of the rotor;
    means for developing a stator current reference signal representing a desired stator current level;
    means for generating an actual stator current signal representing actual current level through the stator coil; and
    control means coupled to s said developing means and said switching means for phase advancing the rotational position at which the positive and negative voltages are applied to the coil according to a difference between said desired and actual stator current level to provide constant current starting.

2. The start control system of claim 1 further comprising means for sensing the speed of rotational movement of said rotor, and wherein said switching means varies the length of time for alternately applying the positive and negative voltage to the coil according to rotor speed.

3. The start control system of claim 1 wherein said control means includes means for inhibiting phase advancing of the rotational position at which the positive and negative voltages are applied to the coil at speeds below a preselected minimum speed.

4. The start control system of claim 1 further comprising means in operative relationship with said control means for phase advancing the rotational position at which the positive and negative voltages are applied to the coil to limit DC power drawn form the source of DC power.

5. The start control system of claim 1 wherein said machine includes a field coil and said start control system further includes means for sensing the speed of said rotor and means for controllably energizing the field coil in accordance with said sensed speed.

6. A power limiting start control system for a brushless DC machine having a rotor and a stator having a stator coil which is controllably energized from a source of DC power defining a positive and a negative DC voltage for imparting rotation to the rotor, comprising:

means for sensing the rotational position of the rotor;
   switching means coupled between the source of DC power and the stator coil for alternately applying the positive and negative voltage to the coil according to the rotational position of said rotor;
   means for developing an input power reference signal representing a desired maximum input power level;
   means for generating an actual input power signal representing actual input power from the source of DC power; and
   control means coupled to said generating means, said developing means and said switching means for modifying the rotational position at which the positive and negative voltages are applied to the coil according to a difference between said desired and actual input power level to provide input power limiting.

7. The start control system of claim 6 further comprising means for sensing the speed of rotational movement of said rotor, and wherein said switching means varies the length of time for alternately applying the positive and negative voltage to the coil according to rotor speed.

8. The start control system of claim 6 wherein said control means includes means for inhibiting modification of the rotational position at which the positive and negative voltages are applied to the coil at speeds below a preselected minimum speed.

9. The start control system of claim 6 further comprising means in operative relationship with said control means for modifying the rotational position at which the positive and negative voltages are applied to the coil to control current in the stator coil.

10. The start control system of claim 6 wherein the DC machine includes a field coil and said start control system further includes means for sensing the speed of said rotor and means for controllably energizing the field coil in accordance with said sensed speed.

11. The start control system of claim 6 wherein the DC machine includes a field coil and said start control system further includes means for sensing reactive power in the stator coil and means coupled to said sensing means for controllably energizing the field coil in accordance with said reactive power to maintain unity power factor operation.

12. A start control system for a brushless DC machine having a rotor and a stator having a stator coil which is controllably energized from a source of DC power defining a positive and a negative DC voltage for imparting rotation to the rotor, comprising:

means for sensing the rotational position of said rotor;
   switching means coupled between the source of DC power and the stator coil for alternately applying the positive and negative voltage to the coil according to the rotational position of the rotor;
   first means for developing a stator current reference signal representing a desired stator current level;
   first means for generating an actual stator current signal representing actual current level through the stator coil;
   second means for developing an input power reference signal representing a desired maximum input power level;
   second means for generating an actual input power signal representing actual input power from the source of DC power;
   first means coupled to said first generating means and said first developing means for determining a current error;
   second means coupled to said second generating means and said second developing means for determining an input power error;
   means coupled to said first and second determining means for selecting one of said errors; and
   control means coupled to said selecting means and said switching means for modifying the rotational position at which the positive and negative voltages are applied to the coil according to the selected error to selectively control input power and stator current 13. The start control system of claim 12 wherein said selecting means selects the lower of the input power error and the current error.

14. The start control system of claim 12 wherein the DC machine includes a field coil and said start control system further includes means for sensing the speed of said rotor and means for controllably energizing the field coil in accordance with said sensed speed.

15. The start control system of claim 12 wherein the DC machine includes a field coil and said start control system further includes means for sensing reactive power in the stator coil and means coupled to said sensing means for controllably energizing the field coil in accordance with said reactive power to maintain unity power factor operation.

16. The start control system of claim 12 further comprising means for sensing the direction of rotational movement of the rotor and means for stopping rotational movement of the rotor if the rotor is rotating in an incorrect motoring direction.

17. The start control system of claim 16 wherein said stopping means includes means for shorting the stator coil.

* * * * *